July 29, 1924.

F. P. WHITAKER

DYNAMO ELECTRIC MACHINE

Filed Nov. 1, 1920   2 Sheets-Sheet 2

1,502,931

Inventor:
Frank P. Whitaker,
by Albert G. Davis
His Attorney.

Patented July 29, 1924.

1,502,931

UNITED STATES PATENT OFFICE.

FRANK PERCY WHITAKER, OF RUGBY, ENGLAND, ASSIGNOR TO GENERAL ELECTRIC COMPANY, A CORPORATION OF NEW YORK.

DYNAMO-ELECTRIC MACHINE.

Application filed November 1, 1920. Serial No. 420,923.

*To all whom it may concern:*

Be it known that I, FRANK PERCY WHITAKER, a subject of the King of Great Britain, residing at Rugby, county of Warwickshire, England, have invented certain new and useful Improvements in Dynamo-Electric Machines, of which the following is a specification.

This invention relates to dynamo machines and more particularly to commutating machines for use with alternating or direct current.

One object of the invention is to improve the commutation of such machines by providing them with special windings. To this end it is proposed to divide each coil of a machine into two sections connected in multiple to the same commutator segments, one section being wound slightly over full pole pitch and the other section slightly under full pole pitch, so that the mean pitch of the two sections will be full pitch.

When my invention is applied to a machine having a multiplex winding I also provide a current collecting device which will still further improve the commutation.

Figure 1:
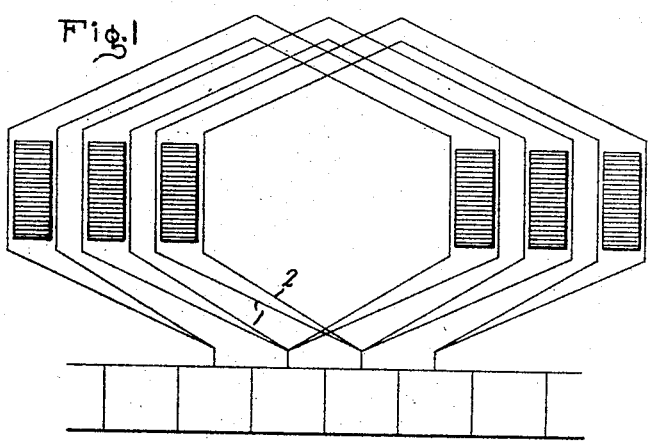
Figure 2:
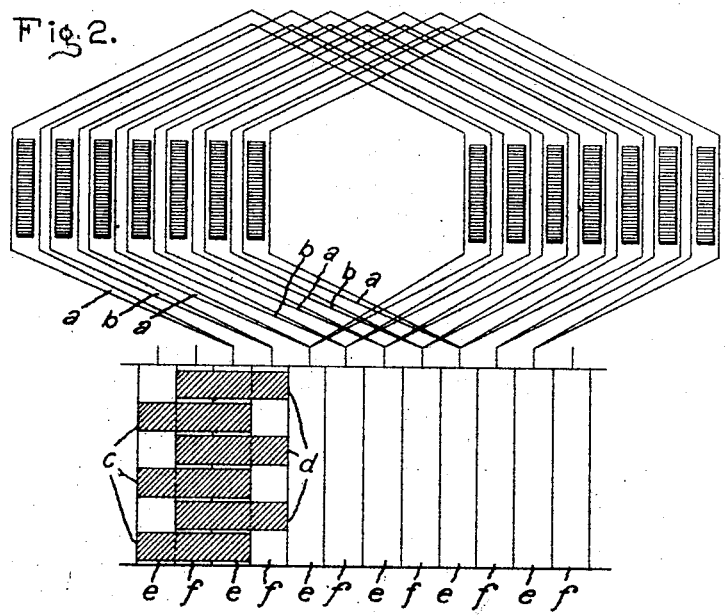
Figures 3, 4:
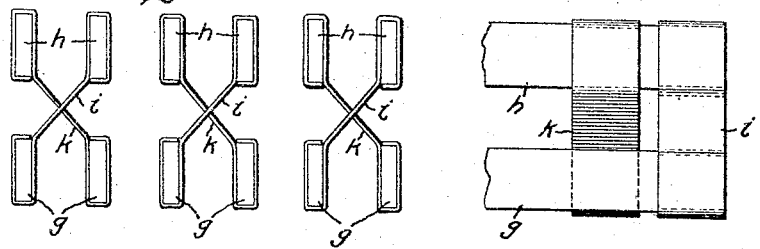
Figure 8:
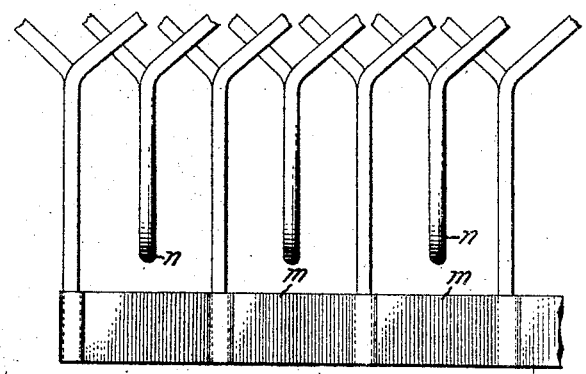

With the above and other objects in view, reference is had to the accompanying drawings wherein Fig. 1 represents the development of a single lap winding embodying my invention; Fig. 2 the development of a duplex winding; Fig. 3 an end elevation of the means for connecting the two half turns of each coil section at the rear of the armature; Fig. 4 is a side elevation and Fig. 5 a top elevation of the structure shown in Fig. 3; Fig. 6 is an end elevation of a modified form of means for connecting the half turns of the coil sections; Fig. 7 is a side elevation and Fig. 8 is a top elevation of the structure shown in Fig. 6.

In the form of winding shown in Fig. 1, each coil is divided into two sections, 1 and 2. Section 1 is wound slightly over full pole pitch and section 2 slightly under full pole pitch. Section 1 occupies two slots, each of which is adjacent to a slot occupied by section 2 and each of the slots is occupied by sections of adjacent coils. It will be observed that by this arrangement the self-induction of each coil is lessened by its subdivision in the manner described and the mutual induction between adjacent coils is increased because of the presence in a single slot of sections of adjacent coils.

In Fig. 2 two windings $a$ and $b$ have their ends secured to alternate commutator segments. Each coil is formed of two sections which occupy adjacent slots and differ slightly in pitch and each slot is occupied by two sections belonging to adjacent coils of different windings. To improve still further the commutation of machines employing windings such as illustrated in Fig. 2, I preferably arrange the commutator brushes on each brush arm in two groups, one group being spaced from the other by a distance of approximately the width of one segment. Thus in the position shown in Fig. 2 the group of brushes $c$ have their forward edges aligned with the forward edges of segments $e$ to which the winding $a$ is attached and the group of brushes $d$ have their forward edges aligned with the segments $f$ to which the winding $b$ is attached. This arrangement of brushes assures a continuous contact with segments connected to each winding.

Figure 5:
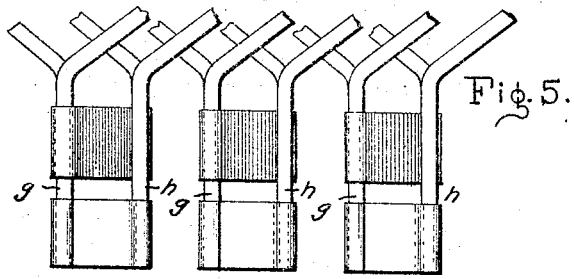
Figures 6, 7:
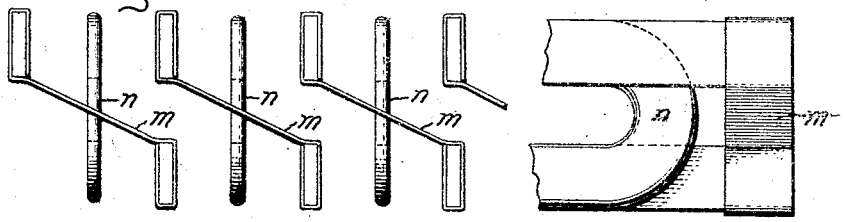

Referring to Figs. 3 to 5, which shows means for connecting half turns of each coil section at the rear of the armature, $g$ represents the ends of conductors which occupy the bottoms of adjacent slots while $h$ are the ends of similar conductors which occupy the tops of adjacent slots. Two of the conductor ends which are diagonally opposite are extended beyond the remaining two and secured to one another by means of a clip $i$. These two conductors form a part of the section of the coil which is slightly under full pitch. The remaining two ends are secured together by a clip $k$, thus joining the halves of the section of the coil which is over full pitch.

In Figs. 6 to 8 the top and bottom conductors of the section of the coil which is under pitch are connected by a clip $m$, the half turns of the section of the coil which is over pitch being made continuous, as is indicated at $n$.

It is obvious that my invention is as applicable to machines having wave windings as it is to machines having lap windings.

What I claim as new and desire to secure by Letters Patent of the United States, is:—

1. An armature having a plurality of windings connected to successive commutator segments, each coil of the winding being formed of two sections, one of which is over and one under full pole pitch, each slot of said armature containing sections of different windings, and a plurality of groups of brushes for each polarity, the brushes of each group arranged to bear at their forward edges upon commutator segments connected to different windings.

2. A winding, each of the coils of which are formed of two sections, one being under and one over pole pitch, each section being formed of a portion which occupies the bottom of one slot, a portion which occupies the top of another slot and a conductor joining the two portions, the conductors which join the portions of two sections of the single coil crossing each other at the rear of the armature.

In witness whereof, I have hereunto set my hand this 26th day of October, 1920.

FRANK PERCY WHITAKER.